(12) United States Patent
Shiao

(10) Patent No.: US 8,054,068 B2
(45) Date of Patent: Nov. 8, 2011

(54) MAGNETIC ABSOLUTE POSITION SENSOR

(75) Inventor: Chih-Mao Shiao, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 497 days.

(21) Appl. No.: 12/390,472

(22) Filed: Feb. 22, 2009

(65) Prior Publication Data

US 2010/0214691 A1    Aug. 26, 2010

(51) Int. Cl.
*G01B 7/14* (2006.01)
(52) U.S. Cl. .......... 324/207.24; 324/207.22; 324/207.23
(58) Field of Classification Search . 324/207.22–207.24
See application file for complete search history.

(56) References Cited

U.S. PATENT DOCUMENTS 5,497,083 A * 3/1996 Nakazato et al. ........ 324/207.24
5,841,274 A * 11/1998 Masreliez et al. ....... 324/207.17

* cited by examiner

*Primary Examiner* — Huy Q Phan
*Assistant Examiner* — Son Le

(57) ABSTRACT

A magnetic absolute position sensor comprises: a read head, a horizontal magnetic scale, and an oblique magnetic scale. The read head is provided with a first position sensing unit and a second position sensing unit which are used produce signal with respect to the horizontal magnetic scale and the oblique magnetic scale, respectively. The distance between the first position sensing unit and the horizontal magnetic scale is constant, and the distance between the second position sensing unit and the oblique magnetic scale changes from narrow to wide. The absolute position identifying system is electrical connected to the first and second position sensing units, respectively, to obtain absolute position coordinates.

6 Claims, 7 Drawing Sheets

MAGNETIC ABSOLUTE POSITION SENSOR

BACKGROUND OF THE INVENTION

1. Field of the Invention

The present invention relates to a magnetic position sensor, and more particularly to a magnetic absolute position sensor.

2. Description of the Prior Art

As shown in FIG. 1, a conventional optical position sensor 90 comprises a grating 91, a light emitter 92 and a light receiver 93. The grating 91 includes a light transmitting portion and a light tight portion. The light emitter 92 emits light toward the grating 91, the light partially passes through the light transmitting portion and reaches the light receiver 93 and is partially stopped by the light tight portion and unable to reach the light receiver 93. The light transmitting portion and light tight portion of the grating 91 are used as identification index to determine the absolute position of the optical position sensor 90.

However, the light emitter 92 and light receiver 93 of the optical position sensor 90 are located at opposite sides of the grating 91, if there are disturbing factors in the working environment, such as fog, smoke, dust and moisture and etc, the light receiver 93 will be unable to receive the correct signals.

The present invention has arisen to mitigate and/or obviate the afore-described disadvantages.

SUMMARY OF THE INVENTION

The primary objective of the present invention is to provide a magnetic absolute position sensor which is capable of sensing position by using magnetic induction.

To achieve the above objective, a magnetic absolute position sensor in accordance with the present invention comprises: a read head, a horizontal magnetic scale, an oblique magnetic scale, and an absolute position identifying system. The read head is provided with a first position sensing unit and a second position sensing unit which are located corresponding to the horizontal magnetic scale and the oblique magnetic scale, respectively. The horizontal magnetic scale has at least one magnetic zone formed on a surface thereof, and the magnetic zone includes an N magnetic pole and an S magnetic pole. The oblique magnetic scale is disposed beside the horizontal magnetic scale and includes a magnetic zone formed a surface thereof, the magnetic zone of the oblique magnetic scale includes an N magnetic pole and an S magnetic pole which are arranged in a direction intersecting an arrangement direction of the N magnetic pole and the S magnetic pole of the horizontal magnetic scale. The absolute position identifying system is connected to the first and second position sensing units, respectively.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
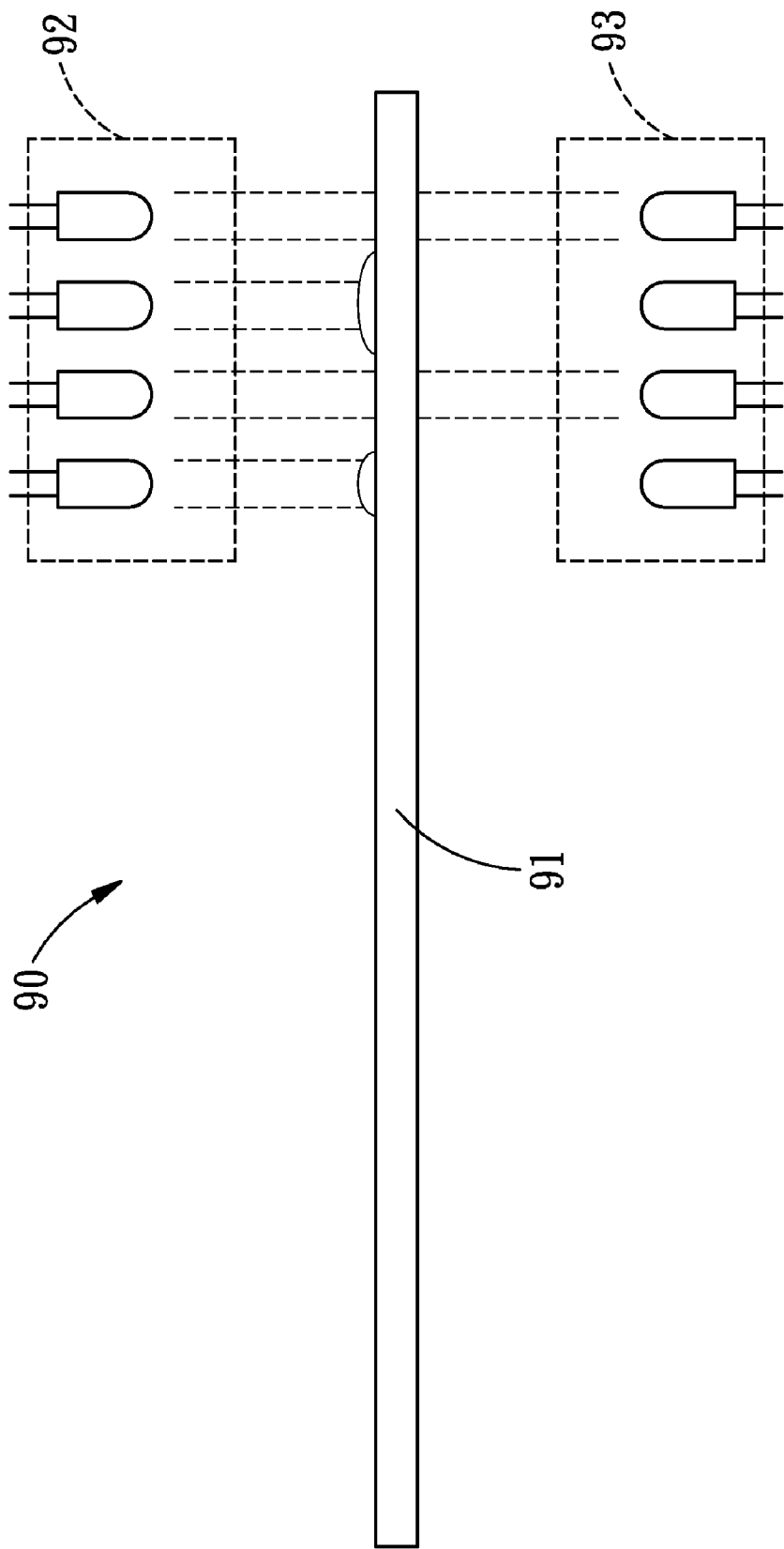
FIG. 1 is a plan view of a conventional optical position sensor.
Figure 2:
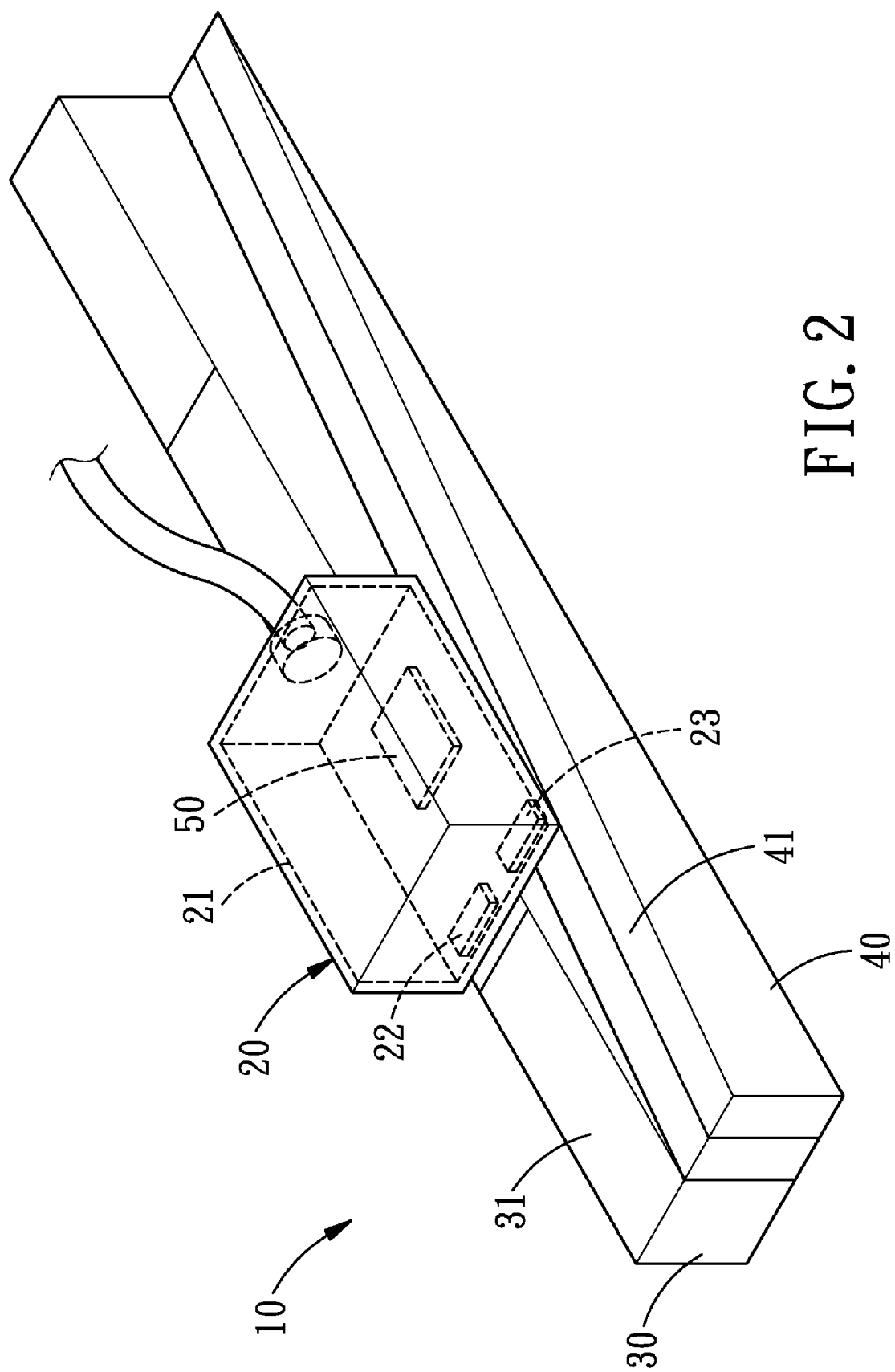
FIG. 2 is a perspective view of a magnetic absolute position sensor in accordance with a first embodiment of the present invention.
Figure 3:
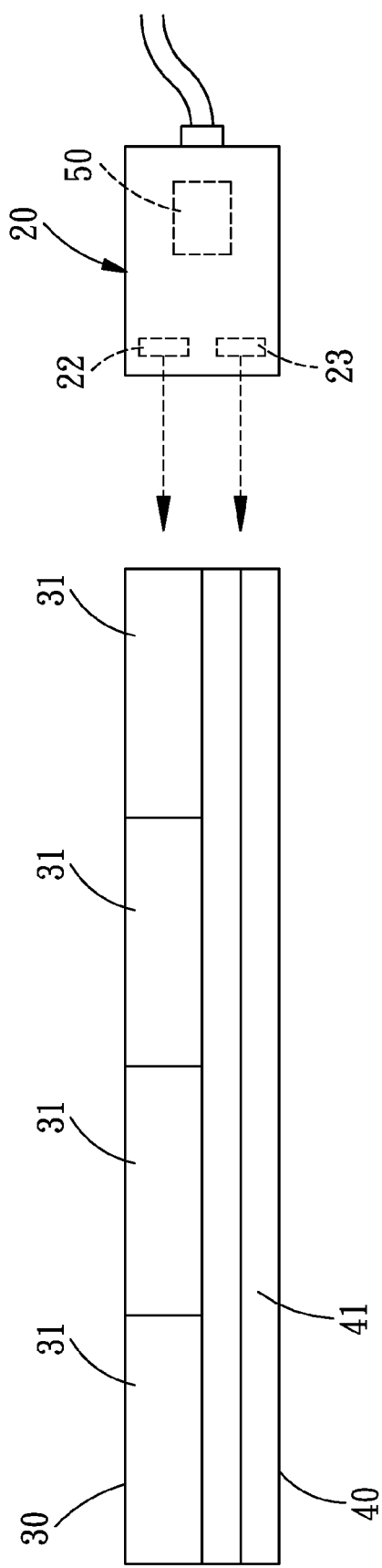
FIG. 3 is a plan view of the magnetic absolute position sensor in accordance with the present invention.
Figure 4:
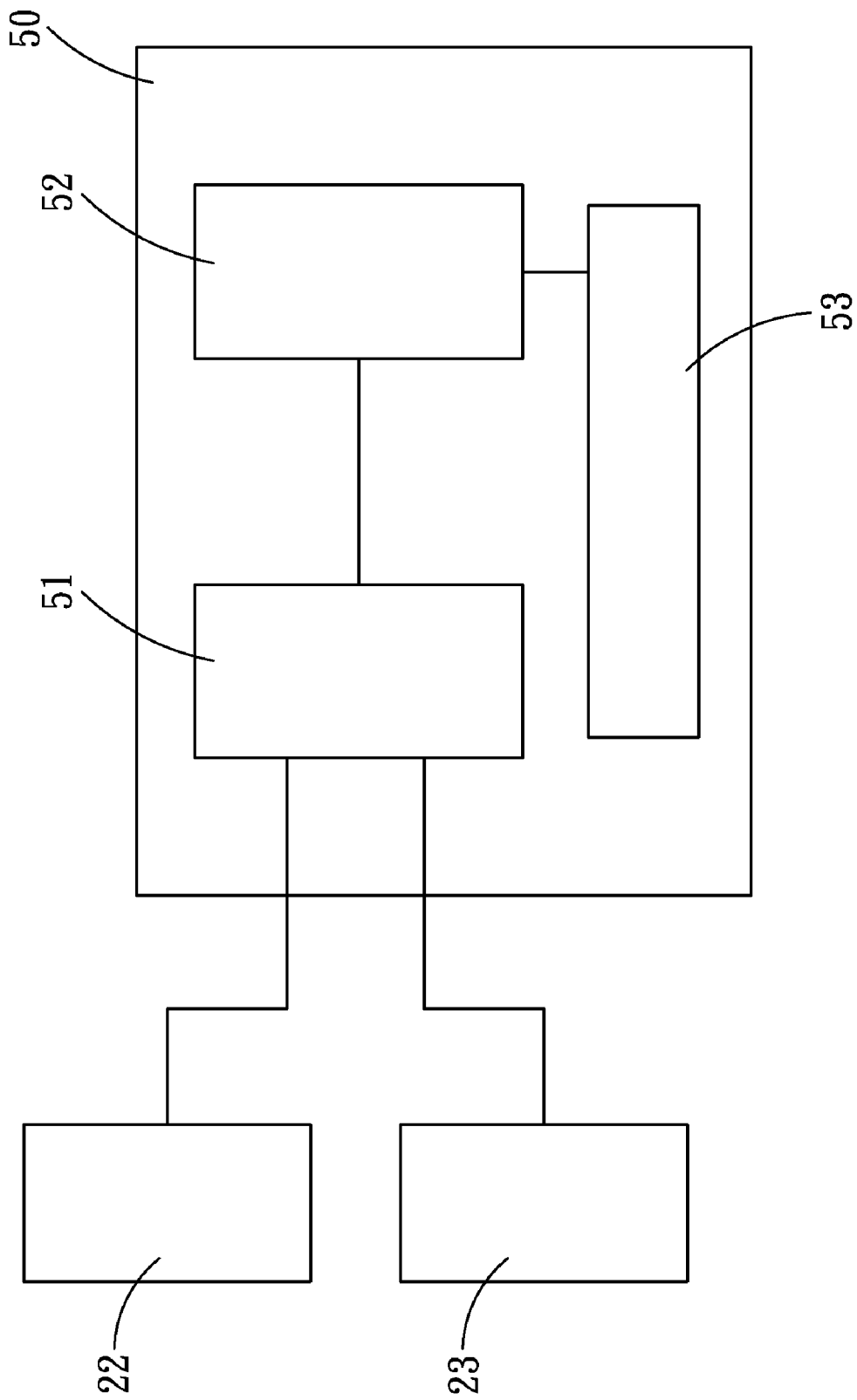
FIG. 4 is an illustrative view showing the system of the present invention.

Referring to FIGS. 2-4, a magnetic absolute position sensor in accordance with the present invention comprises: a read head 20, a horizontal magnetic scale 30, an oblique magnetic scale 40, and an absolute position identifying system 50.

The read head 20 is a rectangular structure with a receiving chamber 21 and has a first and a second position sensing units 22, 23 located at the bottom thereof corresponding to the horizontal magnetic scale 30 and the oblique magnetic scale 40, respectively. The read head 20 is driven by a power source to reciprocate in the extending direction of the horizontal magnetic scale 30 and that of the oblique magnetic scale 40.

The horizontal magnetic scale 30 is quadrangled in cross section and includes at least one magnetic zone 31 horizontally arranged on the surface of the horizontal magnetic scale 30. Each magnetic zone 31 includes an N magnetic pole and an S magnetic pole which are arranged in an extending direction of the horizontal magnetic scale 30.

The oblique magnetic scale 40 is quadrangled in cross section and has an oblique magnetic zone 41 formed on the surface thereof. The magnetic zone 41 includes an N magnetic pole and an S magnetic pole which are arranged in a direction perpendicular to the extending direction of the oblique magnetic scale 40. The oblique magnetic scale 40 is parallel to the horizontal magnetic scale 30, and the arrangement direction (in which the N and S magnetic poles are arranged) of the N and S magnetic poles of the horizontal magnetic scale 30 intersects the arrangement direction of the N and S magnetic poles of the oblique magnetic scale 40.

Figure 5:
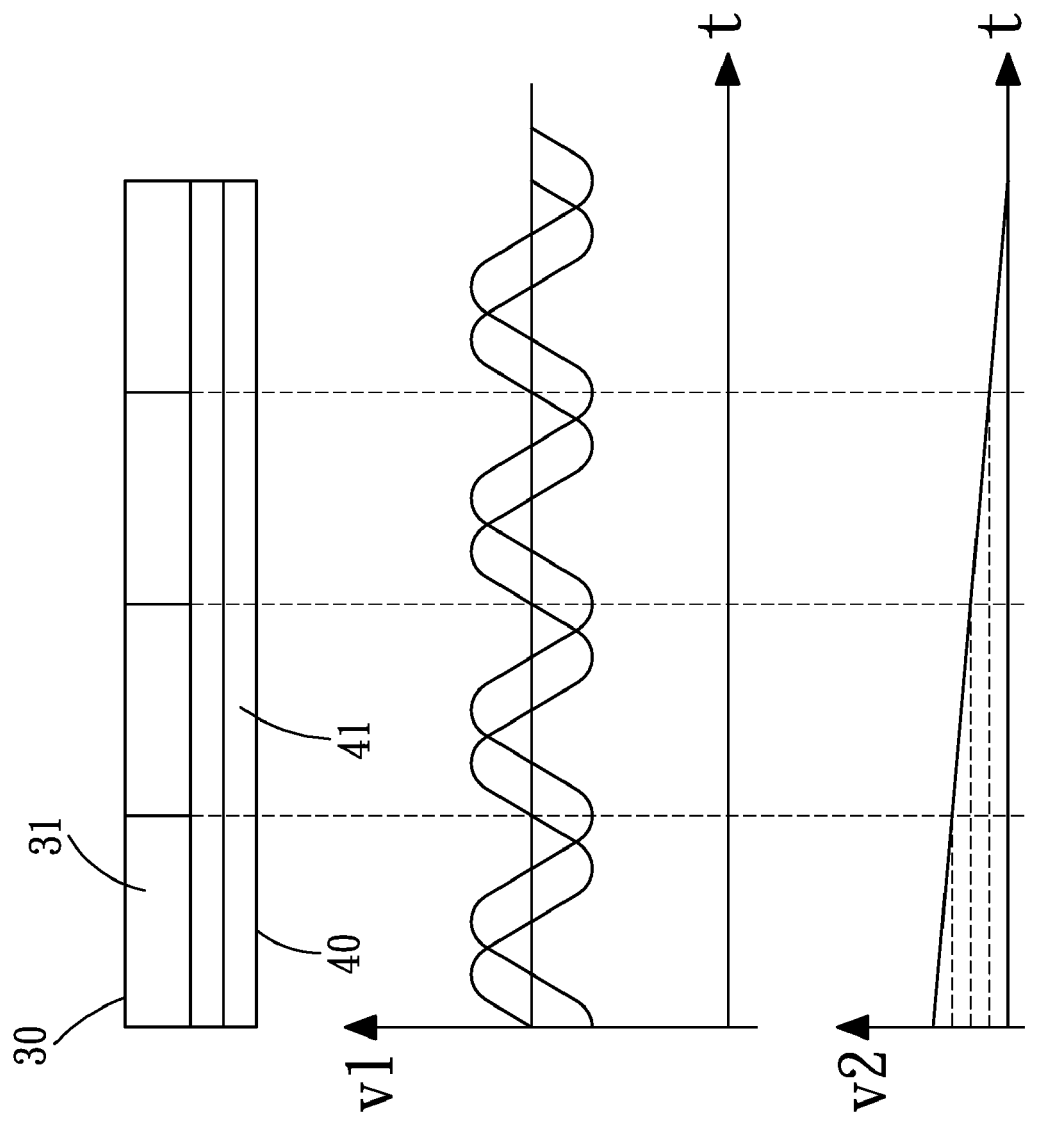
FIG. 5 is a subdivision view in accordance with the present invention.

The first and second position sensing unit 22, 23 move along with the read head 20, and the first position sensing unit 22 moves relative to the horizontal magnetic scale 30 and produce signal. When the read head 20 moves, the distance between the first position sensing unit 22 and the horizontal magnetic scale 30 is constant (as shown in FIG. 5). The second position sensing unit 23 moves relative to the oblique magnetic scale 40 to produce signal. When the read head 20 moves, the distance between the second position sensing unit 23 and the oblique magnetic scale 40 changes from narrow to wide (as shown in FIG. 5).

The absolute position identifying system 50 includes a converting unit 51, a calculation unit 52 and a subdividing unit 53.

Figure 6:
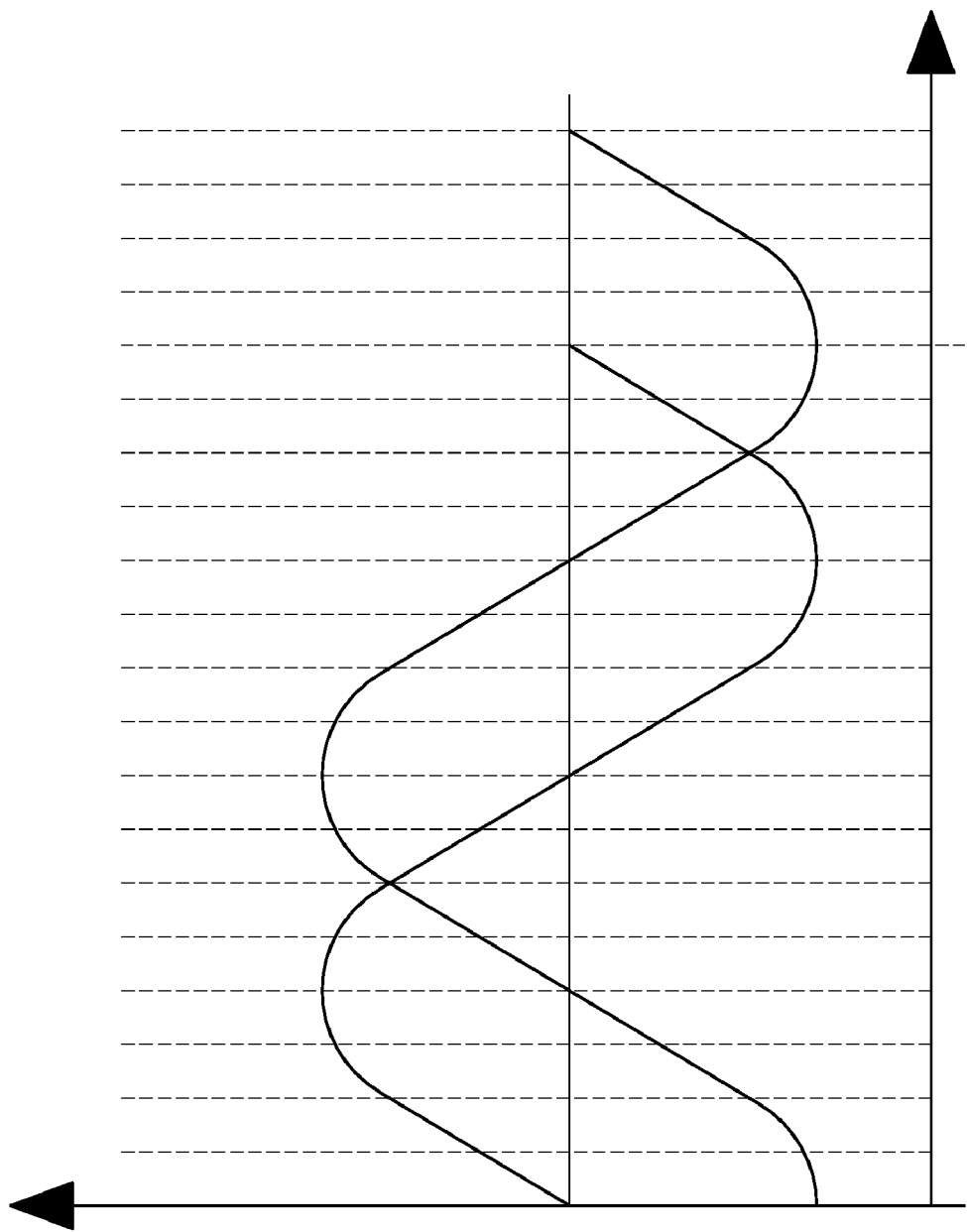
FIG. 6 is another subdivision view in accordance with the present invention.

The absolute position identifying system 50 is disposed in the receiving chamber 21 of the read head 20 in such a manner that the converting unit 51 is electrically connected to the first and second position sensing units 23, 23, respectively, to perform signal conversion by converting analog signal into digital signal. The calculation unit 52 is electrically connected to the converting unit 51 to obtain the first and second position coordinates by performing signal calculation. The subdividing unit 53 is electrically connected to the calculation unit 52 to subdivide the first position coordinates (as shown in FIG. 6), making the first position coordinates have absolute position coordinates with respect to the second position coordinates.

Figure 8:
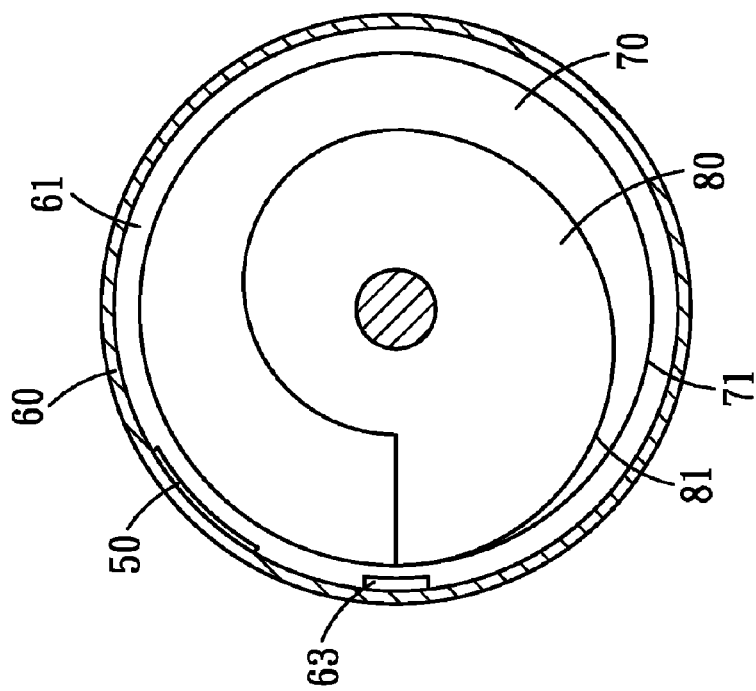
FIG. 8 is a plan view of the magnetic absolute position sensor in accordance with the second embodiment of the present invention.
Figure 7:
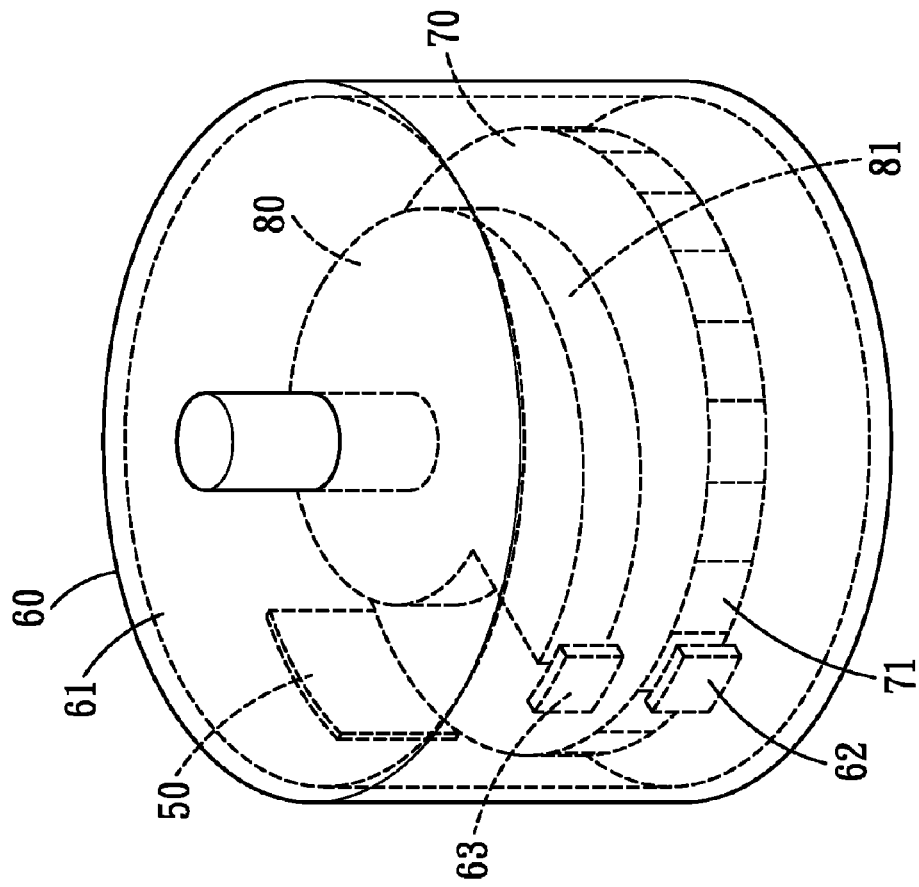
FIG. 7 is a perspective view of a magnetic absolute position sensor in accordance with a second embodiment of the present invention.

Referring to FIGS. 7 and 8, another embodiment of the present invention is shown and its differences over the previous embodiment mentioned above are that: the read head 60 is cylindrical-shaped and includes a receiving chamber 61 in which are disposed a first and a second position sensing units 62, 63 which are located corresponding to a horizontal magnetic scale 70 and an oblique magnetic scale 80, respectively. The horizontal magnetic scale 70 is circular and includes at least one magnetic zone 71 formed on the surface thereof, and each magnetic zone 71 includes an N magnetic pole and an S magnetic pole. The oblique magnetic scale 80 is snail-shaped in cross section and includes a magnetic zone 81 formed on the surface thereof. The magnetic zone 81 includes an N magnetic pole and an S magnetic pole. The oblique magnetic scale 80 and the horizontal magnetic scale 70 are axially disposed in the receiving chamber 61 of the read head 60.

The horizontal magnetic scale 70 and the oblique magnetic scale 80 are driven by the same power source and rotate synchronously. The horizontal magnetic scale 70 produces signal with respect to the first position sensing unit 62. When the horizontal magnetic scale 70 rotates, the distance between the first position sensing unit 62 and the horizontal magnetic scale 70 is constant. The oblique magnetic scale 80 rotates relative to the second position sensing unit 63 to produce signal. When the oblique magnetic scale 80 moves, the distance between the second position sensing unit 63 and the oblique magnetic scale 80 changes from narrow to wide. The absolute position identifying system 50 is disposed in the receiving chamber 61 of the read head 60.

While we have shown and described various embodiments in accordance with the present invention, it is clear to those skilled in the art that further embodiments may be made without departing from the scope of the present invention.

What is claimed is:

1. A magnetic absolute position sensor, comprising:
  a read head being connected to a power source and having a receiving chamber and being provided with a first position sensing unit and a second position sensing unit;
  a horizontal magnetic scale having at least one magnetic zone formed on a surface thereof, the magnetic zone including an N magnetic pole and an S magnetic pole, the first position sensing unit produces signal relative to the horizontal magnetic scale, and a distance between the first position sensing unit and the horizontal magnetic scale is constant;
  an oblique magnetic scale disposed beside the horizontal magnetic scale and including a magnetic zone formed a surface thereof, the magnetic zone of the oblique magnetic scale having an N magnetic pole and an S magnetic pole arranged in a direction intersecting an arrangement direction of the N magnetic pole and the S magnetic pole of the horizontal magnetic scale, the second position sensing unit produces signal relative to the oblique magnetic scale, and a distance between the second position sensing unit and the oblique magnetic scale is not constant; and
  an absolute position identifying system including a converting unit and a calculation unit and being disposed in the receiving chamber of the read head, the converting unit being connected to the first and second position sensing units, respectively, to perform signal conversion, the calculation unit being connected to the converting unit to work out absolute position coordinates through signal calculation.

2. The magnetic absolute position sensor as claimed in claim 1, wherein the N magnetic pole and the S magnetic pole of the horizontal magnetic scale are arranged in an extending direction of the horizontal magnetic scale, and the N magnetic pole and the S magnetic pole of the oblique magnetic scale are arranged in an extending direction of the oblique magnetic scale.

3. The magnetic absolute position sensor as claimed in claim 1, wherein the absolute position identifying system further comprises a subdividing unit electrically connected to the calculation unit.

4. A magnetic absolute position sensor, comprising:
  a read head having a receiving chamber and being provided with a first position sensing unit and a second position sensing unit;
  a horizontal magnetic scale disposed in the receiving chamber of the read head and connected to a power source, at least one magnetic zone being formed on a surface of the horizontal magnetic scale and including an N magnetic pole and an S magnetic pole, the first position sensing unit produces signal relative to the horizontal magnetic scale, and a distance between the first position sensing unit and the horizontal magnetic scale is constant;
  an oblique magnetic scale disposed in the receiving chamber of the read head and connected to the power source and located beside the horizontal magnetic scale, a magnetic zone being formed a surface of the oblique magnetic scale and having an N magnetic pole and an S magnetic pole arranged in a direction intersecting an arrangement direction of the N magnetic pole and the S magnetic pole of the horizontal magnetic scale, the second position sensing unit produces signal relative to the oblique magnetic scale, and a distance between the second position sensing unit and the oblique magnetic scale is not constant; and
  an absolute position identifying system including a converting unit and a calculation unit and being disposed in the receiving chamber of the read head, the converting unit being connected to the first and second position sensing units, respectively, to perform signal conversion, the calculation unit being connected to the converting unit to work out absolute position coordinates through signal calculation.

5. The magnetic absolute position sensor as claimed in claim 4, wherein the N magnetic pole and the S magnetic pole of the horizontal magnetic scale are arranged in an extending direction of the horizontal magnetic scale, and the N magnetic pole and the S magnetic pole of the oblique magnetic scale are arranged in an extending direction of the oblique magnetic scale.

6. The magnetic absolute position sensor as claimed in claim 4, wherein the absolute position identifying system further comprises a subdividing unit electrically connected to the calculation unit.

* * * * *